United States Patent
Suzuki et al.

(10) Patent No.: US 7,003,309 B2
(45) Date of Patent: Feb. 21, 2006

(54) MASTER-SLAVE COMMUNICATION SYSTEM AND ELECTRONIC APPARATUS UTILIZING SUCH SYSTEM

(75) Inventors: Wataru Suzuki, Kyoto (JP); Hiroshi Miura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 403 days.

(21) Appl. No.: 10/154,696

(22) Filed: May 23, 2002

(65) Prior Publication Data
US 2002/0183092 A1 Dec. 5, 2002

(30) Foreign Application Priority Data
May 29, 2001 (JP) ............................. 2001-159871

(51) Int. Cl.
*H04B 15/00* (2006.01)
*G06F 1/12* (2006.01)

(52) U.S. Cl. .................. 455/502; 455/574; 709/209; 709/210; 713/2; 713/400

(58) Field of Classification Search .......... 455/557, 455/426.1, 556, 550.1, 502, 574; 709/209, 709/208, 210, 211; 340/825; 710/110; 713/2, 713/400
See application file for complete search history.

(56) References Cited

U.S. PATENT DOCUMENTS

| | | | | |
|---|---|---|---|---|
| 4,393,501 A | * | 7/1983 | Kellogg et al. | 714/749 |
| 4,872,003 A | * | 10/1989 | Yoshida | 340/825.21 |
| 5,495,240 A | * | 2/1996 | Heberle | 340/870.13 |
| 5,729,721 A | * | 3/1998 | Bettelheim et al. | 713/502 |
| 5,841,996 A | * | 11/1998 | Nolan et al. | 710/305 |
| 6,209,022 B1 | * | 3/2001 | Sotek et al. | 709/209 |
| 6,611,557 B1 | * | 8/2003 | Kobayashi | 375/225 |
| 6,671,752 B1 | * | 12/2003 | Rao et al. | 710/52 |
| 6,728,534 B1 | * | 4/2004 | Izumi et al. | 455/426.1 |
| 6,763,413 B1 | * | 7/2004 | Oh | 710/107 |
| 2001/0023468 A1 | * | 9/2001 | Oh | 710/129 |
| 2001/0055965 A1 | * | 12/2001 | Delp et al. | 455/420 |
| 2002/0000834 A1 | * | 1/2002 | Ooishi | 326/113 |
| 2002/0103005 A1 | * | 8/2002 | Watts et al. | 455/556 |
| 2002/0118199 A1 | * | 8/2002 | Mukherjee et al. | 345/504 |
| 2002/0133662 A1 | * | 9/2002 | Cheung | 710/310 |

* cited by examiner

*Primary Examiner*—Sonny Trinh
*Assistant Examiner*—Khai Nguyen
(74) *Attorney, Agent, or Firm*—Hogan & Hartson, LLP

(57) ABSTRACT

A communication system has a master device and a slave device clocked by the system clock generated by the master device for data transfer between them. When no data transfer takes place between them for a predetermined period, the slave device goes into a sleep mode. The slave device in the sleep mode can return to the active mode when it receives a system clock. Thus, the slave device can be placed in the sleep mode and return to the active mode without any additional signal lines. The communication system can save a large amount of power during the sleep.

8 Claims, 6 Drawing Sheets

MASTER-SLAVE COMMUNICATION SYSTEM AND ELECTRONIC APPARATUS UTILIZING SUCH SYSTEM

FIELD OF THE INVENTION

The invention relates to a master-slave communication system for use in serial data transfer between a master device and a slave device, and to electronic apparatus utilizing such a system.

BACKGROUND OF THE INVENTION

In conventional master-slave systems transferring data, a limited number of data transfer lines including a clock line, data lines, and chip selection lines are established between them to transfer synchronized serial data. Such conventional master-slave communication systems are widely used for inter-chip communication in many electronic apparatuses including cellular phones.

In this type of conventional communication system, slave devices must be held active at all time in order to wait for incoming signals. Therefore, the slave devices cannot be inactivated (sleep mode) even when they do not receive any data for a long time.

Hence, when used in electronic apparatus such as a cellular phone that utilizes batteries, conventional master-slave systems waste electric power during disconnected periods, shortening life of the batteries. This becomes serious when a multiplicity of slave devices are involved.

It is possible to save power during disconnected periods by providing additional signal lines between the master device and the slave device to inform the status of the slave device and control the slave device. However, in order to do this, the number of the signal lines must be increased, which inevitably increase the size, and hence the cost, of the system.

SUMMARY OF THE INVENTION

It is therefore an object of the invention to provide a communication system for use in synchronized serial data transfer between a master device and a slave device, the slave device adapted to assume a sleep mode when it is not in communication with the master device, without increasing the number of signal lines connecting them, whereby power consumption by the slave is saved when the slave device is not in communication.

It is another object of the invention to provide electronic apparatus utilizing such master-slave communication system.

In one aspect of the invention, there is provided a communication system comprising:

a master device; and at least one slave device connected with said master device by a clock line and at least one data line, said slave device and said master device are adapted to serially exchange data in synchronism with the system clock generated by said master device, wherein the slave device goes into a sleep or quiescent mode when no data transfer takes place between the master and the slave devices for a predetermined period; and the slave device in the sleep mode returns to the active mode upon receipt of at least one system clock.

In this system, a time interval in which no communication is made between the master and the slave devices (the interval hereinafter referred to as zero communication time) is measured by either the master device or the slave device to detect the status of the slave device that it is not in communication (the status will be referred to as zero communication). When the zero communication time exceeds the predetermined period, the zero communication status is detected, and then the slave device goes into the sleep mode where the slave device stays inactive (i.e. quiescent not participating in communication). This permits reduction of power consumption by the slave device.

The slave device in the sleep mode is adapted to respond to a return request from the master device by detecting a system clock and possibly dummy data accompanying the system clock. This enables the slave device to restore its active state without any extra signal lines.

In another aspect of the invention, there is provided a communication system which includes a master device; and at least one slave device connected with the master device by a clock line and at least one data line, wherein the slave device has a host controller, a serial interface (I/F) equipped with a buffer, and an internal clock; and wherein said slave device and said master device are adapted to serially exchange data in synchronism with said system clock;

the slave device goes into a sleep mode when zero communication status lasts a predetermined period; and upon receipt of a system clock and data from the master device, the slave device in the sleep mode stores the data in the memory buffer and restores its active state. As the slave device returns to the active state, the host controller retrieves the data stored in the buffer into the host controller.

This communication system may save electric power equally well as the preceding system. The slave device in the sleep mode is adapted to respond to a return request from the master device by detecting a system clock and data accompanying the system clock, and returns to the active state. The slave device is also adapted to store the data in the buffer. The stored data is transferred from the memory buffer to the host controller as legitimate data as the slave device returns to the active state. In this manner, the data received during the return request can be used as legitimate data, so that no dummy data is necessary. Thus, the slave device requires only a short time to restore its active state (said restoration time will be referred to as return process time), thereby allowing the communication system to carry out fast serial communication.

In the slave device, the host controller may be continually clocked by the internal clock, but not the serial I/F, by providing the internal clock to the host controller but not to the serial I/F during the sleep mode. This makes it possible to reduce the power consumption by the serial I/F to virtually zero level during the sleep, and shorten the return process time.

When the slave device is in the sleep mode, clocking of both the serial I/F and the host controller may be stopped by not providing the internal clock to them. In this mode power consumption by the serial I/F and the host controller is further reduced to virtually zero in the slave device.

The zero communication time can be determined by a timer provided in the slave device. Thus, return procedure of the slave device can be carried out by the slave device by itself.

In a further aspect of the invention, there is provided an electronic apparatus equipped with a master-slave communication system as described above.

BRIEF DESCRIPTION OF THE DRAWINGS

The invention will now be described by way of example with reference to the accompanying drawings, in which.

DETAILED DESCRIPTION OF THE PREFERRED EMBODIMENT

Figure 1:
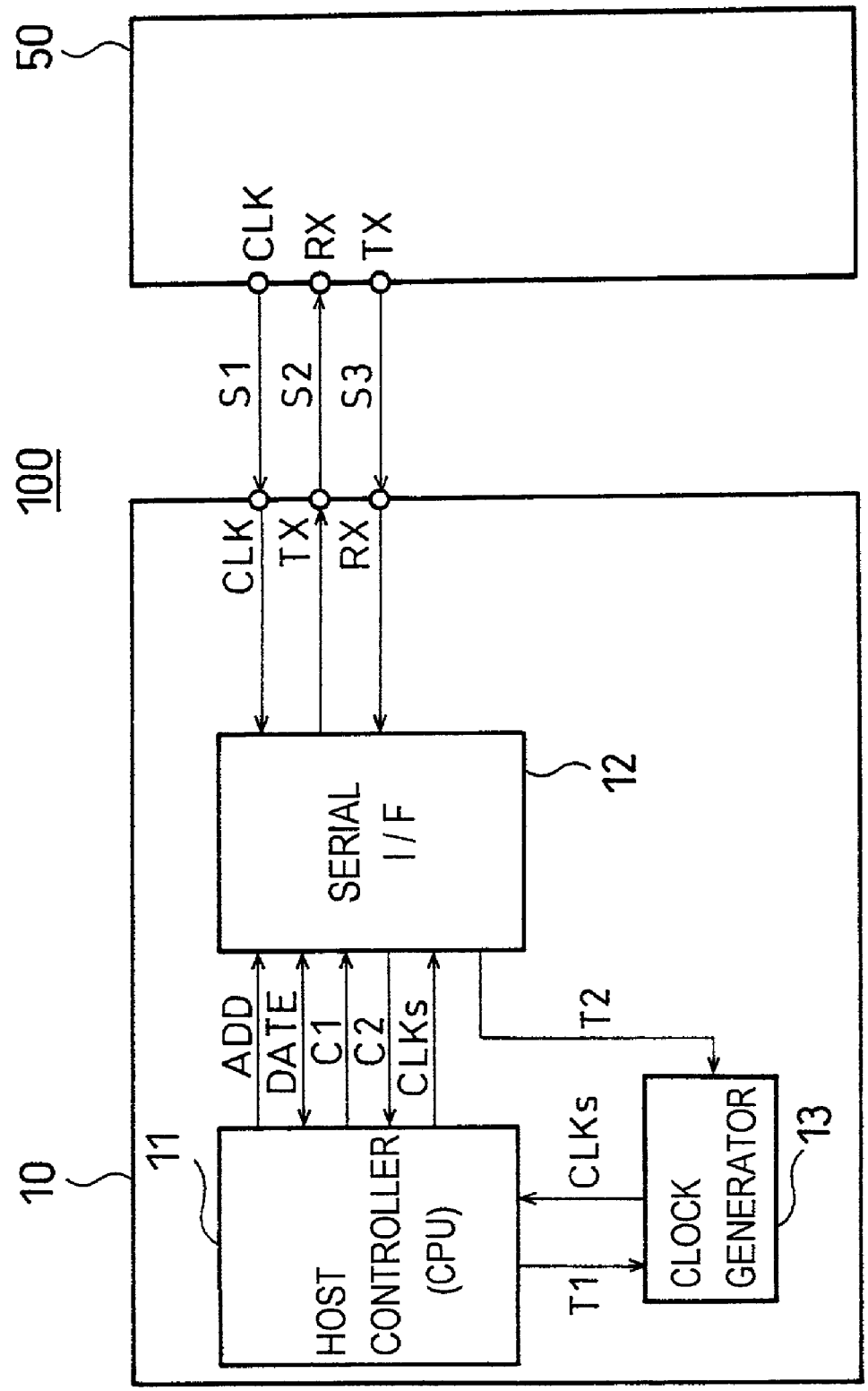
FIG. 1 is a block diagram of a first communication system according to the invention.
Figure 2:
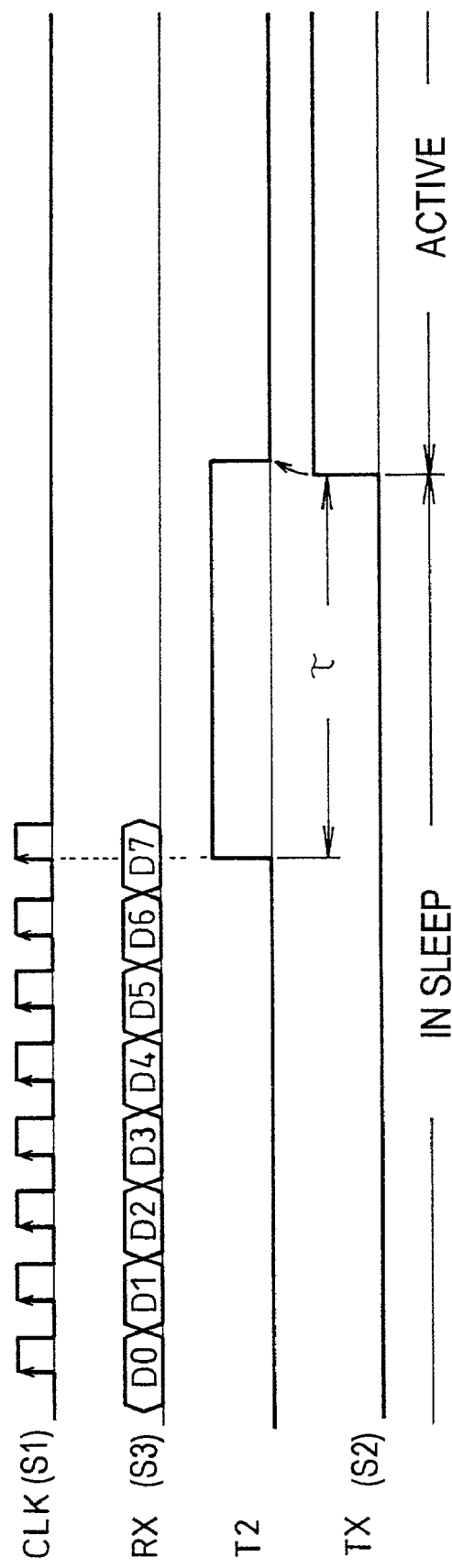
FIG. 2 is a timing diagram of the slave device shown in FIG. 1 returning from a sleep mode to an active mode.

Referring now to FIG. 1, there is shown a first embodiment of a master-slave communication system according to the invention. FIG. 2 shows a timing diagram of the communication system of FIG. 1, with the slave device in a sleep mode returning to an active mode. Flowcharts of FIGS. 3(a) and (b) depict the operations of the communication system carried out by the master device (FIG. 3(a)) and the slave device (FIG. 3(b)).

As shown in FIG. 1, a first communication system 100 has a slave device 10 and a master device 50, which are connected by a system clock line S1, an up data line S2, and a down data line S3. A chip select signal line (not shown) may be also connected to the chip as needed.

System clock CLK is generated by the master device 50 and supplied onto the system clock line S1. The master device 50 may be formed of a general purpose one-chip microcomputer. The up data line S2 transmits data TX issued by the slave device 10 to the master device 50. The down data line S3 transmits data RX issued by the master device 50 to the slave device 10. These data are transferred in synchronism with the system clock CLK.

The slave device 10 has a host controller 11, which includes a CPU and a serial interface (I/F) 12. The serial I/F 12 converts parallel data received from the host controller 11 into serial data and transfers the converted data TX to the master devicer 50 in synchronism with the system clock CLK. The serial I/F 12 also receives serial data RX from the master device 50 in synchronism with the system clock CLK, and converts the data into parallel data before storing them in the host controller 11. To do this, the host controller 11 and the serial I/F 12 are coupled with address data ADD, date data DATE, control signals C1 and C2, and a slave clock CLKs to thereby cooperate with each other.

The host controller 11 is provided with a timer (not shown) to measure and determine the time interval in which the master and the slave devices are not in communication with each other (said time interval referred to as zero communication time). When a determination is made that the zero communication time exceeds a predetermined time, a transition trigger signal T1 is generated by the timer to cause the slave device 10 to go into a sleep mode.

In the sleep mode, the slave clock of the slave device 10 is stopped, but the power supply to the slave device 10 will not be cut down, leaving the slave device quiescent or sleeping. Stopping the slave clock advantageously leads to substantially zero power consumption by the slave device.

The serial I/F 12 is provided with a return trigger generator (not shown), which generates a return trigger signal T2 to wake up the sleeping slave device 10 upon receipt of a system clock CLK and data RX from the master device 50. Alternatively, the return trigger signal T2 may be generated based solely on the system clock CLK.

The generation of the return trigger signal T2 upon receipt of the system clock and the data RX is effected by detecting for example a voltage or a current associated with the clock CLK and/or data RX. Thus, the generation of a return trigger signal T2 does not require a slave clock CLKs. Data received by the slave device 10 during the sleep is not saved.

A clock generator 13 is provided in the slave device 10 to generate an internal slave clock CLKs. The clock generator 13 stops its oscillation and terminates generation of the slave clock CLKs when it receives a transition trigger signal T1, and restarts its operation as it receives a return trigger signal T2. The clock generator 13 may be provided in the host controller 11.

Operations of the first communication system 100 will now be described with reference to the timing diagram shown in FIG. 2 and the flowcharts of the master device 50 and the slave device 10 shown in FIGS. 3(a) and (b), respectively.

Under normal operating condition, the master device 50 and the slave device 10 of the first communication system 100 exchange data as needed. During a data transfer, the clock generator 13 generates a slave clock CLKs, and the host controller 11 and the serial I/F 12 are active.

Figure 3:
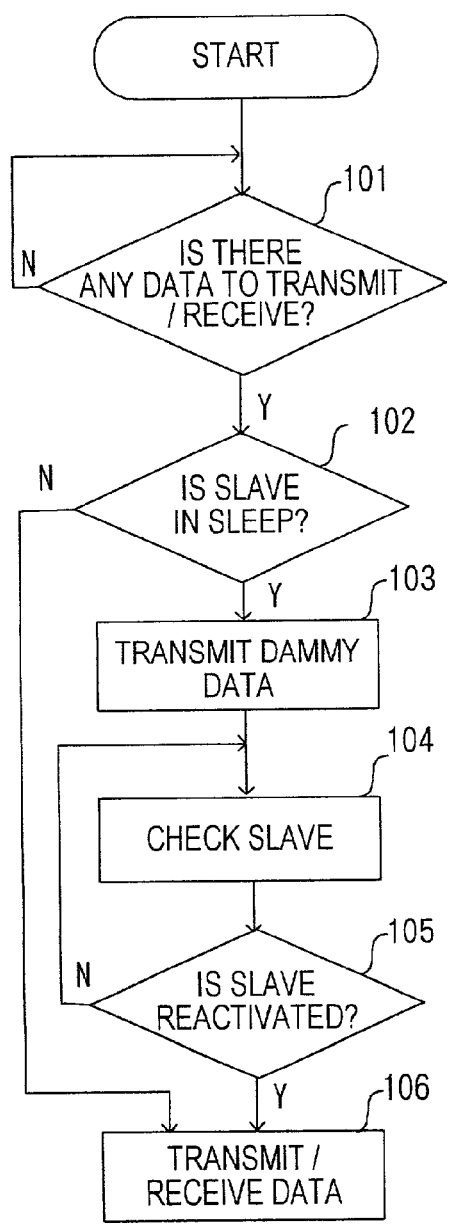
FIGS. 3(a) and (b) are flowcharts depicting operations of the communication system of FIG. 1.
Figure 3:
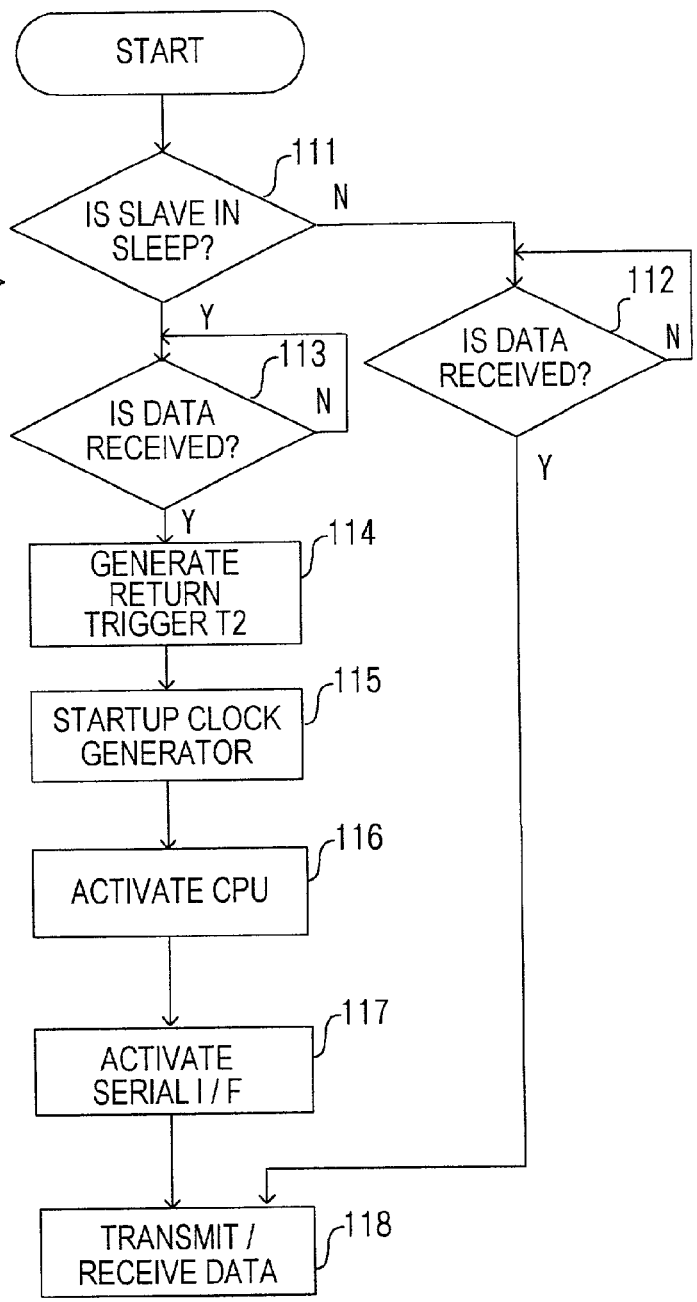

In this active mode, when a data transmission/reception event takes place in the master device 50 (Step 101, FIG. 3(a)), data transmission/reception will be started, since then the slave device 10 is not in the sleep mode (Step 102). On the other hand, since the slave device 10 is not in the sleep mode (Step 111) as shown in FIG. 3(b), it readily begins data transmission/reception operation (Step 118) if there is any data received from the master device (Step 112).

If the data transfer between the master device 50 and the slave device 10 has ceased at least temporally, the timer in the host controller 11 begins to time that quiescent interval. If the data transfer is resumed within a predetermined period, the timer is reset to zero. However, if the quiescent interval reaches the predetermined period, then the host controller 11 provides a transition trigger signal T1 to the clock generator 13 to stop the oscillation of the clock generator 13. This causes the host controller 11 and the serial I/F 12 to make transition from the active state to the sleep state, thereby reducing the power consumption by the slave device 10 to substantially zero level.

In the sleep mode, the slave device 10 sets the line for the outgoing data TX to a low (L) level, which in turn causes the up data line S2 to stay in the low (L) level. Knowing that the up data line S2 has been pulled to the L level for the predetermined period, the master device 50 recognizes that the slave device 10 has fallen in the sleep mode.

If a data transmission/reception event takes place in the master device 50 (Step 101), the master device 50 inquires if the slave device is in the sleep mode (Step 102). If the answer is YES, then the master device proceeds to Step 103, where it sends a system clock CLK and dummy data to the slave device 10 (Step 103). The dummy data may be prepared beforehand in the master device 50 or may be replaced by actual or legitimate data.

Subsequent to the transmission of the system clock CLK and the dummy data, the master device 50 monitors the slave device 10 (Step 104) and determines if the slave device 10 has returned to the active state (Step 105). This can be done by checking the level of the up data line S2. This monitoring will be continued until a confirmation is made that the slave device 10 has restored the active state.

On the other hand, although the slave device 10 is in the sleep mode (Step 111), the serial I/F 12 of the slave device receives dummy data D0–D7 if they come in synchronism with the system clock CLK (Step 113). The serial I/F 12 accepts the dummy data at each rise of the system clock CLK. The reception of the dummy data by the serial I/F 12 implies detection or recognition of the arrival of dummy data by the slave device.

The detection of the dummy data results in generation of a return trigger signal T2 by the serial I/F 12 (Step 114) as shown in FIG. 2. Alternatively, the return trigger signal T2 may be generated upon detection of a predetermined number of system clocks by the serial I/F 12.

The clock generator 13 is started up by a return trigger signal T2 supplied to it (Step 115), which in turn generates a slave clock CLKs. The slave clock CLKs generated by the clock generator 13 enables the host controller 11 to return to the active state (Step 116). Then the serial I/F 12 is enabled to return to the active state (Step 117). This causes the slave device 10 to regain its active state and become able to undergo normal data transfer with the master device (Step 118).

The slave device 10 requires a certain period τ (referred to as return process time) to restore its active state subsequent to the generation of a return trigger signal T2, as shown in FIG. 2. After the return process time τ, the data line for the outgoing data TX is pulled to a high (H) level and so is the up data line S2 to the H level. This change is informed to the master device 50.

The master device 50 thus confirms the return of the slave device 10 to the active state (Step 105). At this stage, data transfer between them is possible (Step 106).

Instead of providing the host controller 11 of the slave device 10 with the timer for measuring the zero communication time, a timer may be provided in the master device 50 to carry out similar control of the slave device. In this case, the slave device 10 is monitored and controlled by the timer such that the slave device goes into the sleep mode when the zero communication time lasts the predetermined period. In this case, all the communications of the entire system are controlled by the master device 50, so that the transitions of the slave device 10 between the sleep mode and the active mode can be controlled without any difficulty.

It would be appreciated that in FIG. 1 the system can advantageously suppress power consumption during the sleep mode, since the clock generator 13 is then stopped, rendering the entire slave device 10 quiescent. In this mode, however, the slave device 10 requires a little longer return process time τ, because in order for the slave device to restore its active state it must first restart the clock generator 13, then host controller 11, and finally the serial I/F 12.

As an alternative, the serial I/F 12 can be kept quiescent while keeping the clock generator 13 running and the host controller 11 active in the sleep mode. It is noted that in this instance it is easy to keep the serial I/F 12 quiescent, since the serial I/F 12 is already under the control of host controller 11. It is appreciated that in this configuration the return process time can be shorter. Furthermore, because the energy consuming serial I/F 12 can be kept quiescent in the sleep mode, power consumption by the slave device 10 can be effectively reduced.

Figure 4:
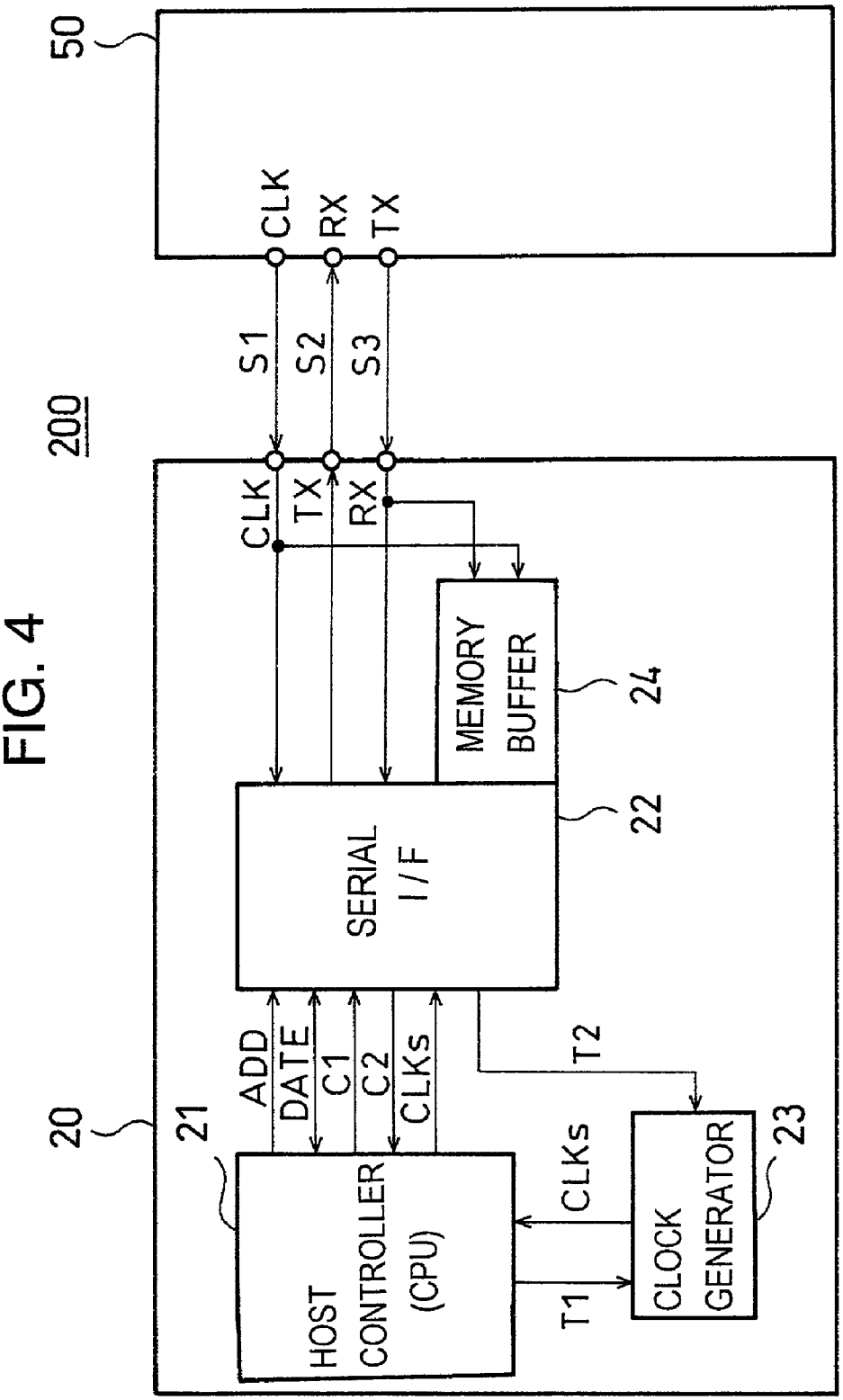
FIG. 4 is a block diagram of a second communication system according to the invention.
Figure 5:
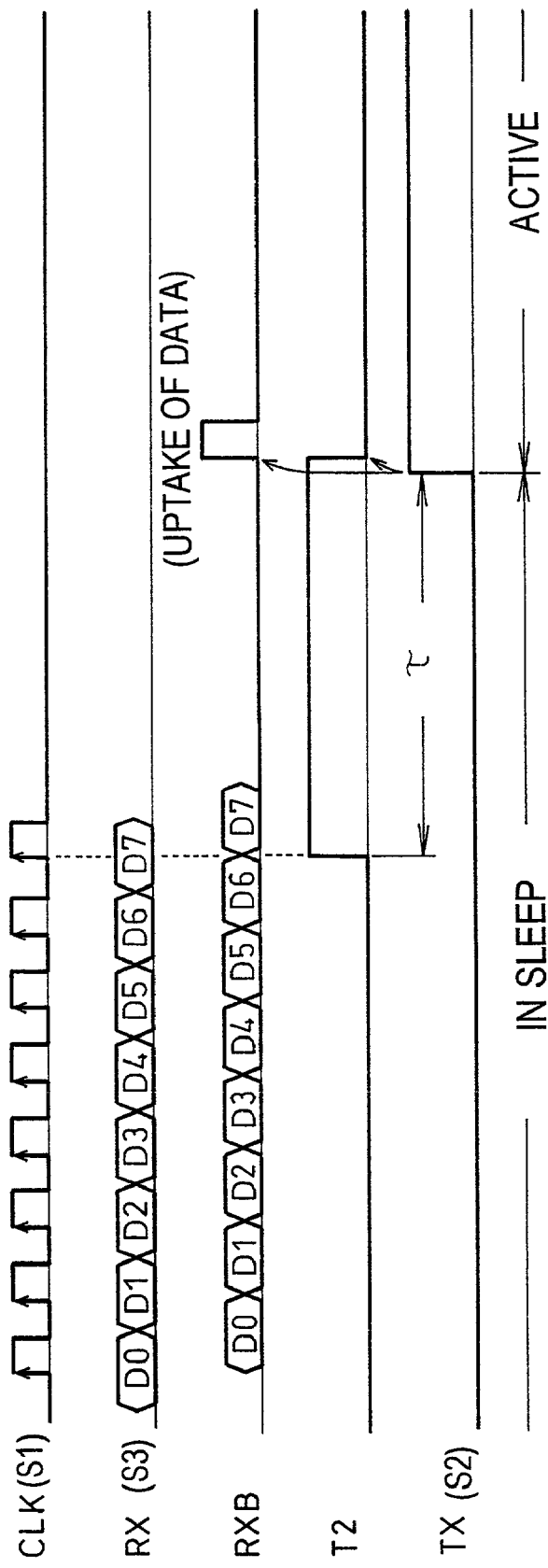
FIG. 5 is a timing diagram of the slave device shown in FIG. 4 returning from a sleep mode to an active mode.

FIG. 4 shows a second communication system 200 suitable for synchronized serial data transfer according to the invention. FIG. 5 shows the timing of the slave device 20 returning from the sleep mode to the active mode. The master device 50 and the slave device 20 follow respective return procedures depicted in FIGS. 6(a) and (b).

In the second embodiment shown herein, the system is provided with a memory buffer dedicated for storing the data received from the master device during the sleep. Such memory buffer permits the slave device 20 to cut wasteful return process time and re-establish fast data transfer with the master device 50.

The second communication system 200 of the invention as shown in FIG. 4 is adapted to carry out synchronized serial communication. The system has a slave device 20 connected with a master device 50 by means of a system clock line S1, an up data line S2, and a down data line S3. Additional chip select signal lines (not shown) may be connected to the chip as needed.

The slave device 20 has a host controller 21 which includes a CPU, a serial I/F 22, a clock generator 23, and a memory buffer 24. As compared with the device shown in FIG. 1, the slave device 20 additionally has the memory buffer 24.

The dedicated memory buffer 24 receives and stores data serially sent from the master device 50 in synchronism with the system clock CLK. The data thus stored is then parallelly retrieved into the host controller 21 in synchronism with the slave clock CLKs generated by the host controller 21. The memory buffer 24 has a storage capacity in the range from 1 to a few bytes.

Other components such as host controller 21, serial I/F 22, clock generator 23 can be the same as the corresponding components shown in FIG. 1, so that their descriptions will be omitted.

Figure 6:
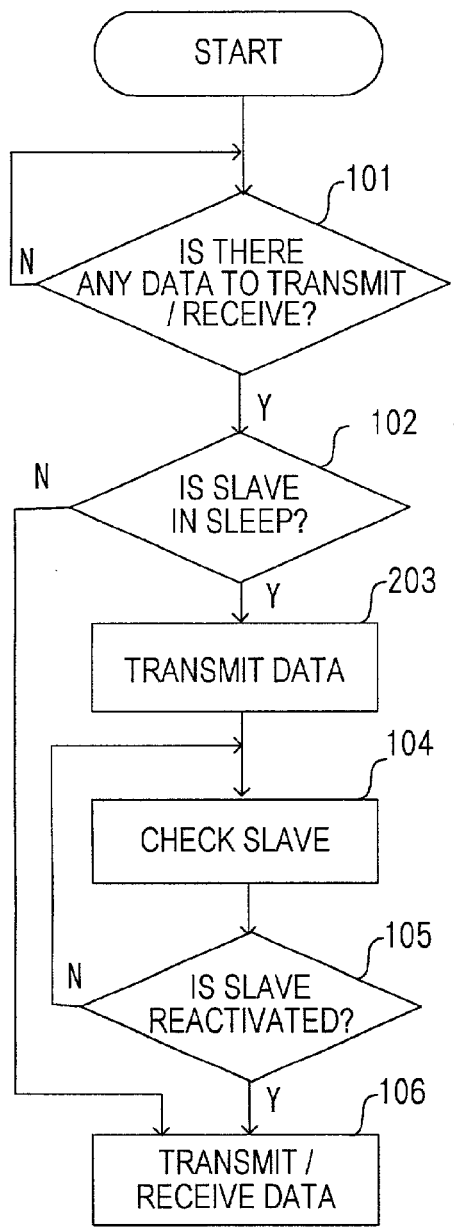
FIGS. 6(a) and (b) are flowcharts depicting operations of the communication system of FIG. 4.
Figure 6:
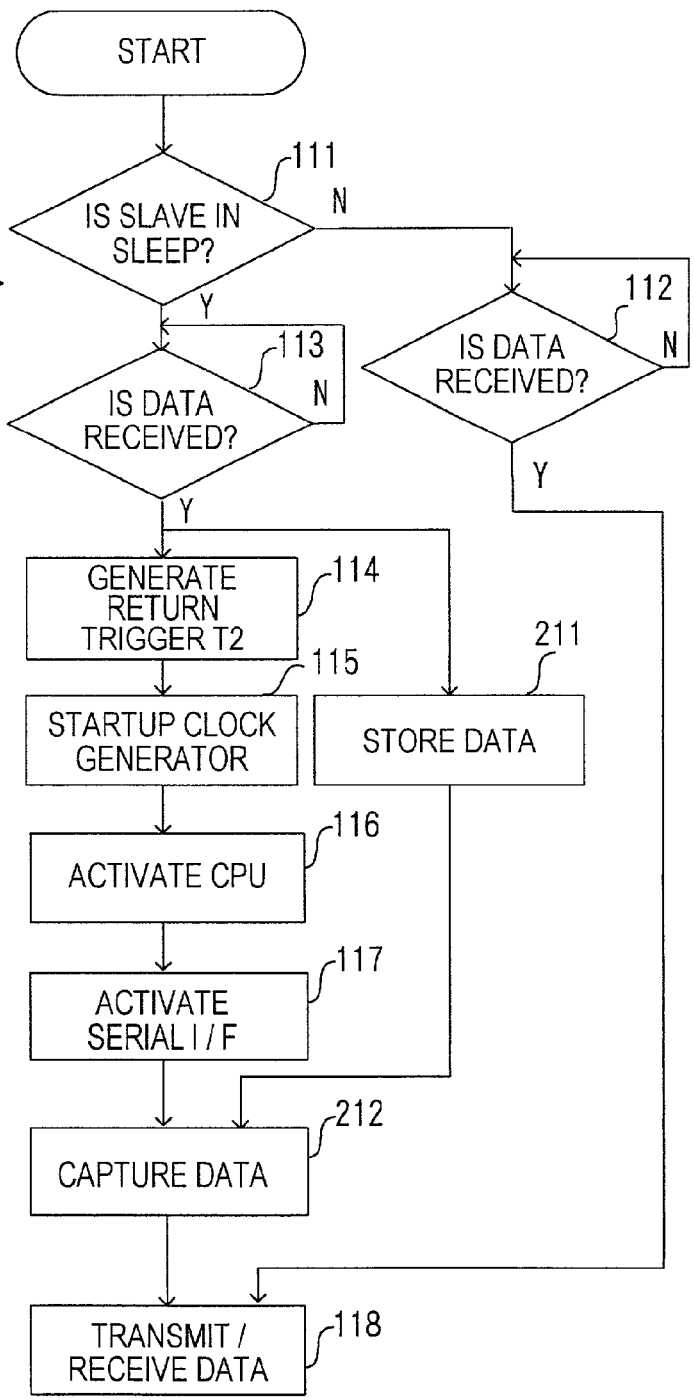

Referring now to the timing diagram of FIG. 5 and the flowcharts of the master device 50 and the slave device 20 as shown in FIGS. 6(a) and (b), respectively, operations of the second communication system 200 will now be described.

In the communication system 200, the master device 50 and the slave device 20 exchange data as needed under normal operating condition, as in the first embodiment 100.

If the data transfer between the master device 50 and the slave device 20 has ceased and become quiescent at least temporally, the timer in the host controller 21 begins to time that quiescent period. If the data transfer is resumed within a predetermined period, the timer is reset to zero. However, if the timed quiescent period has reached the predetermined time, then the host controller 21 issues a transition trigger signal T1 to the clock generator 23 to stop the oscillation of the clock generator 23. The stopping of the slave clock CLKs stops the host controller 21 and the serial I/F 22, thereby reducing the power consumption by the slave device 20 to substantially zero.

In the sleep mode, the slave device 20 sets the line for the data TX to a low (L) level, which in turn causes the up data line S2 to stay in the low (L) level. Knowing that the up data line S2 has been pulled to the L level for the predetermined period, the master device 50 recognizes that the slave device 20 has fallen in the sleep mode.

If a data transmission/reception event takes place in the master device 50 (Step 101), the master device 50 inquires if the slave device 20 is in the sleep mode (Step 102). If the answer is YES, then the master device proceeds to Step 203, where the master device sends a system clock CLK and dummy data to the slave device 20 (Step 203). This data is not dummy data but it is legitimate.

Subsequent to the transmission of the system clock CLK and the data, the master device 50 monitors the slave device 20 (Step 104) and determines if the slave device 20 has returned to the active mode (Step 105). This can be done by checking the level of the up data line S2. This monitoring will be continued until a confirmation is made that the slave device 20 has restored the active state.

On the other hand, although the slave device 20 is in the sleep mode (Step 111), the slave device 20 receives the system clock CLK and data D0–D7 sent from the master device 50 (Step 113).

The sequence of data D0–D7 thus received, now denoted as RX-B in FIG. 5, is stored in the memory buffer 24 one at a time at the rise of the system clock CLK (Step 211).

In parallel with the reception of the data by the memory buffer 24, the serial I/F 22 also receives the system clock CLK (or alternatively the system clock CLK and the data D0–D7). Upon detection of the predetermined number of the system clocks CLK received, a return trigger signal T2 is generated (Step 114).

The return trigger signal T2 is supplied to the clock generator 23 to start up the clock generator 23 (Step 115). The clock generator 23 in turn generates a slave clock CLKs to reactivate the host controller 21 (Step 116). The serial I/F 22 is also reactivated (Step 117).

The host controller 21 parallelly retrieves the data from the memory buffer 24 the return process time τ after the trigger.

Next, the slave device 20 sets the line for the data TX, and hence the up data line S2, to H level, thereby informing the master device 50 of the change in the state of the slave device 20. Now that the slave device 20 has returned to the active state, it is capable of executing normal data communication (Step 118).

As to the master device 50, when it is confirmed that the slave device 20 has returned to the active state (Step 105), the master device 50 can start data communication with the slave device 20 (Step 106). Thus, the master device 50 resumes sending the remaining data that follows the piece of data sent to the sleeping slave device 20.

Incidentally, the data stored in the memory buffer 24 during the sleep is transferred therefrom to the host controller 21 when the slave device returns to the active mode so that the data can be used as part of the original data in the resumed data communication. The stored data can be also used as buffered data.

In the second embodiment shown herein, when the slave device 20 is in the sleep mode, the serial I/F 22 can be kept quiescent to save power consumption while keeping the clock generator 23 and the host controller 21 enabled. Because of this feature, the return process time τ can be made shorter, and in addition power consumption by the slave device 20 greatly reduced during the sleep.

In the descriptions of the first and the second embodiments above, it is tacitly assumed that there is a one-to-one correspondence between the master and slave devices. However, the invention is not limited to this configuration. For example, a multiplicity of slave devices may be connected with one master device.

When a multiplicity of slave devices 10, . . . (or 20, . . . ) are connected, the first and the second embodiments need be partly modified, as follows.

First, chip select lines are provided connecting the respective slave devices 10, . . . (or 20, . . . ) with the master device 50. Selection of a particular slave device 10, . . . (or 20, . . . ) is made by pulling the chip select line associated with the slave device to L (or H) level.

Timers are provided between the master device 50 and the respective slave devices 10, . . . (or 20, . . . ) to measure individual zero communication times of the slave devices. A serial sleep instruction is sent to each of the slave devices 10, . . . (or 20, . . . ) found not in communication with the master device for a time interval that exceeds the predetermined period to sleep the slave device.

Those slave sleeping devices 10, . . . (or 20, . . . ) may restore the active mode in response to a return request from the master device 50. In returning to the active mode, the slave device pulls its line for the data TX (and hence up data line S2) to H level for a predetermined period of time and then pulls it down to L level. On the other hand, the master device 50 confirms the return of a designated slave device 10, . . . (or 20, . . . ) by detecting the temporary rise of the up data line S2 subsequent to the return request.

An alternative approach to find a quiescent (i.e. non-communicating) slave device 10, . . . (or 20, . . . ) is to look for a chip select line which has not been selected for a predetermined period, so that the slave device associated with the chip select line may be set in the sleep mode. The slave device set in the sleep mode may be returned to the active state mode when the associated chip select line is selected. In this case, however, since the master device cannot judge if the selected slave device is in the sleep mode or not, the master device preferably sends dummy message before sending legitimate data to the slave device.

With these modifications, a single master device may deal with a multiplicity of slave devices 10, . . . (or 20, . . . ) in just the same way as in the first and the second embodiments.

We claim:

1. A communication system, comprising:
a master device generating a system clock; and
at least one slave device connected with said master device by a clock line and at least one data line, wherein
said slave device and said master device are adapted to serially exchange data in synchronism with said system clock;
said slave devices goes into a sleep mode when zero communication status lasts a predetermined period; and
upon receipt of at least one system clock, said slave device in said sleep mode returns to the active state, wherein
said slave device has a serial interface (I/F), a host controller, and an internal clock;
said internal clock is provided to said host controller but not to said serial I/F in said sleep mode;
wherein duration of said zero communication status is determined by a timer provided in said slave device.

2. A communication system, comprising:
a master device generating a system clock; and
at least one slave device connected with said master device by a clock line and at least one data line, wherein
said slave device and said master device are adapted to serially exchange data in synchronism with said system clock;
said slave devices goes into a sleep mode when zero communication status lasts a predetermined period; and
upon receipt of at least one system clock, said slave device in said sleep mode returns to the active state, wherein
said slave device has a serial interface (I/F), a host controller, and an internal clock; and
said internal clock is not provided to said serial interface (I/F) nor to said host controller in said sleep mode;
wherein duration of said zero communication status is determined by a timer provided in said slave device.

3. A communication system, comprising:

a master device generating a system clock; and at least one slave device connected with said master device by a clock line and at least one data line, wherein said slave device having a host controller and a serial interface (I/F) equipped with a memory buffer, said slave device and said master device are adapted to serially exchange data in synchronism with said system clock;

said slave device goes into a sleep mode when zero communication status lasts a predetermined period;

upon receipt of a system clock and data from said master device, said slave device in said sleep mode stores said data in said memory buffer and restores its active state; and said host controller retrieves said data from said memory buffer as said slave device returns to said active state, wherein said slave device further has an internal clock; and said internal clock is provided to said host controller but not to said serial I/F in said sleep mode;

wherein duration of said zero communication status is determined by a timer provided in said slave device.

4. A communication system, comprising:

a master device generating a system clock; and at least one slave device connected with said master device by a clock line and at least one data line, wherein said slave device having a host controller and a serial interface (I/F) eauipped with a memory buffer, said slave device and said master device are adapted to serially exchange data in synchronism with said system clock;

said slave device goes into a sleep mode when zero communication status lasts a predetermined period;

upon receipt of a system clock and data from said master device, said slave device in said sleep mode stores said data in said memory buffer and restores its active state; and said host controller retrieves said data from said memory buffer as said slave device returns to said active state, wherein said slave device further has an internal clock; and said internal clock is not provided to said serial interface (I/F) nor to said host controller in said sleep mode;

wherein duration of said zero communication status is determined by a timer provided in said slave device.

5. An electronic apparatus having a communication system including:

a master device generating a system clock; and at least one slave device connected with said master device by a clock line and at least one data line, wherein said slave device and said master device are adapted to serially exchange data in synchronism with said system clock;

said slave device goes into a sleep mode when zero communication status lasts a predetermined period; and upon receipt of at least one system clock, said slave device in said sleep mode returns to the active state, wherein said slave device has a serial interface (I/F), a host controller, and an internal clock;

said internal clock is provided to said host controller but not to said serial I/F in said sleep mode;

wherein duration of said zero communication status is determined by a timer provided in said slave device.

6. An electronic apparatus having a communication system including:

a master device generating a system clock; and at least one slave device connected with said master device by a clock line and at least one data line, wherein said slave device and said master device are adapted to serially exchange data in synchronism with said system clock;

said slave device goes into a sleep mode when zero communication status lasts a predetermined period; and upon receipt of at least one system clock, said slave device in said sleep mode returns to the active state, wherein said slave device has a serial interface (I/F), a host controller, and an internal clock;

said internal clock is not provided to said serial interface (I/F) nor to said host controller in the sleep mode;

wherein duration of said zero communication status is determined by a timer provided in said slave device.

7. An electronic apparatus having a communication system which includes a master device generating a system clock and at least one slave device connected with said master device by a clock line and at least one data line, wherein said slave device having a host controller and a serial interface (I/F) equipped with a memory buffer, said slave device and said master device are adapted to serially exchange data in synchronism with said system clock;

said slave device goes into a sleep mode when zero communication status lasts a predetermined period;

upon receipt of a system clock and data from said master device, said slave device in said sleep mode stores said data in said memory buffer and restores its active state; and said host controller retrieves said data from said memory buffer as said slave device returns to said active state, wherein said slave device further has an internal clock; and said internal clock is provided to said host controller but not to said serial I/F in said sleep mode;

wherein duration of said zero communication status is determined by a timer provided in said slave device.

8. An electronic apparatus having a communication system which includes a master device generating a system clock and at least one slave device connected with said master device by a clock line and at least one data line, wherein said slave device having a host controller and a serial interface (I/F) equipped with a memory buffer, said slave device and said master device are adapted to serially exchange data in synchronism with said system clock;

said slave device goes into a sleep mode when zero communication status lasts a predetermined period;

upon receipt of a system clock and data from said master device, said slave device in said sleep mode stores said data in said memory buffer and restores its active state; and said host controller retrieves said data from said memory buffer as said slave device returns to said active state, wherein said slave device further has an internal clock; and said internal clock is not provided to said serial interface (I/F) nor to said host controller in said sleep mode;

wherein duration of said zero communication status is determined by a timer provided in said slave device.

* * * * *